United States Patent [19]

Williams et al.

[11] Patent Number: 5,221,335
[45] Date of Patent: Jun. 22, 1993

[54] STABILIZED PIGMENTED HOT MELT INK CONTAINING NITROGEN-MODIFIED ACRYLATE POLYMER AS DISPERSION-STABILIZER AGENT

[75] Inventors: Kevin G. Williams; John P. N. Haxell, both of Bath; Derek E. Wilson, Somerset, all of Great Britain

[73] Assignee: Coates Electrographics Limited, Bath, Great Britain

[21] Appl. No.: 719,647

[22] Filed: Jun. 21, 1991

Related U.S. Application Data

[63] Continuation of Ser. No. 528,102, May 23, 1990, abandoned.

[51] Int. Cl.$^5$ .............................................. C09D 11/00
[52] U.S. Cl. ................................ 106/23 A; 106/20 R; 106/22 R; 106/22 A; 106/31 R; 524/487; 524/521; 524/555
[58] Field of Search ............... 106/22, 31, 22 R, 31 R, 106/20 R, 22 A, 23 A; 524/487, 521, 555

[56] References Cited

U.S. PATENT DOCUMENTS

| | | | |
|---|---|---|---|
| 3,048,544 | 8/1962 | Stewart et al. | 252/51.5 A |
| 3,940,353 | 2/1976 | Martorano | 523/508 |
| 4,395,524 | 7/1983 | Emmons et al. | 524/555 |
| 4,636,258 | 1/1987 | Hayashi et al. | 524/487 |
| 4,732,815 | 3/1988 | Mizobuchi et al. | 428/195 |
| 4,772,518 | 9/1988 | Marthe | 524/555 |
| 4,776,887 | 10/1988 | Kuroda et al. | 106/31 |
| 4,839,414 | 6/1989 | Bederke et al. | 524/555 |
| 4,840,848 | 6/1989 | Koshizuka et al. | 428/413 |
| 4,851,045 | 7/1989 | Taniguchi | 106/22 |
| 4,892,775 | 1/1990 | Song | 524/555 |
| 4,910,249 | 3/1990 | Kania et al. | 524/555 |

OTHER PUBLICATIONS

The Condensed Chemical Dictionary, Tenth Ed. Jul. 1986, p. 824.
McCutcheon's 1982 Functional Materials pp. 95, 99 and 102.

*Primary Examiner*—Paul Lieberman
*Assistant Examiner*—Bradley A. Swope
*Attorney, Agent, or Firm*—Brumbaugh, Graves, Donohue & Raymond

[57] ABSTRACT

In the embodiments described in the specification, a stabilized, pigmented hot melt ink contains a thermoplastic vehicle, a coloring pigment, and a dispersion-stabilizing agent to inhibit settling or agglomeration of the pigment when the ink is molten comprising 1.5 to 20 weight percent of a nitrogen-modified acrylate polymer. A preferred dispersion-stabilizing agent is the nitrogen-modified methacrylate polymer marketed by Rohm and Haas as Plexol 1525.

6 Claims, No Drawings

# STABILIZED PIGMENTED HOT MELT INK CONTAINING NITROGEN-MODIFIED ACRYLATE POLYMER AS DISPERSION-STABILIZER AGENT

This application is a continuation of application Ser. No. 528,102, filed on May 23, 1990, now abandoned.

BACKGROUND OF THE INVENTION

This invention relates to hot melt inks containing dispersed pigments and, more particularly, to a pigmented hot melt ink in which the pigment dispersion is effectively stabilized.

Pigmented hot melt inks have significant advantages over hot melt inks containing dyes. One advantage is that pigments tend to be more light-fast than dyes, which is an important factor in connection with the storage of printed images. In addition, pigments tend to be more heat-stable than dyes and this is especially important when the ink is a hot melt ink applied at an elevated temperature of, for example, 80°-150° C. Furthermore, pigments are less likely than dyes to bleed or sublime and they may be either opaque or transparent, whereas dyes are transparent and have little covering power.

Heretofore, however, dyes have usually been preferred for use in hot melt inks, particularly for ink jet inks, since they are completely dissolved in the medium and cannot settle whereas pigments, being suspended and dispersed, may settle to the bottom of a reservoir or agglomerate to block ink jet ink nozzles.

In inks containing a liquid vehicle such as water or oil, pigments such as carbon black, phthalocyanine blue, lithol rubine and diarylide yellow have previously been used and surface-active materials or the like have been added to such inks in order to wet the pigment and break agglomerates of primary pigment particles, disperse the pigment to develop color strength and stabilize the pigment from settling or agglomerating. In hot melt inks such as those containing low-polarity hydrocarbon waxes and polymers which are used at elevated temperatures, it has been found that such surface-active materials do not provide adequate particle wetting or dispersion stability. Among the additives used in liquid-vehicle inks which have been found to be essentially ineffective as pigment dispersants and pigment stabilizers in hot melt inks are alkyd polymers, materials containing amphipathic molecules such as Solsperses ®, lecithins, alkylated polyvinyl pyrrolidones, metal soaps, stearic acid, paraffin wax, polyethylene wax, carnauba wax, candelilla wax, montan wax, hydrogenated castor oil, microcrystalline wax, behenic acid, aluminum stearate, synthetic ester waxes, oxidized polyethylene waxes, lauric acid, Fischer-Tropsch waxes, esparto waxes, dammar wax, oxazoline wax, bisamide waxes, amide waxes, oleamides, stearamides, lauramides, erucamide, glycerol monostearate, glycerol tristearate, chlorinated waxes, cetyl alcohol, stearone, laurone, diphenyl phthalate, dicyclohexyl phthalate, camphor, triphenyl phosphate, n-ethyl toluene sulphonamide, n-cyclohexyl-p toluene sulphonamide and other natural and synthetic polymers and resins.

Moreover, even if such prior art additives were effective, many of them would not be useful in hot melt inks because they tend to degrade or evaporate at high temperature or to impart an undesired color to the ink or are otherwise incompatible with the ingredients of a hot melt ink. Furthermore, where hot melt inks are intended for use in an ink jet printer, for example, the physical properties of the ink must be carefully controlled to assure proper operation of the printer. Consequently, any additive which may affect the physical properties of the ink is undesirable. Also, pigmented hot melt inks tend to flocculate or agglomerate after extended exposure to high temperature and high shear stress to which they are subjected in a hot melt ink jet system.

SUMMARY OF THE INVENTION

Accordingly, it is an object of the present invention to provide a pigmented hot melt ink which overcomes the above-mentioned disadvantages of the prior art.

Another object of the invention is to provide a pigmented hot melt ink suitable for use in a hot melt ink jet printer.

A further object of the invention is to provide a hot melt ink composition having excellent stability after extended exposure to high temperature and high shear stress in an ink jet printing system.

These and other objects of the invention are attained by providing a pigmented hot melt ink that contains a relatively low-polarity ink vehicle and one or more heat-stable dispersion stabilizers which are compatible with the relatively low-polarity vehicle.

Among the compatible heat-stable dispersion stabilizers suitable for use in the invention are: ashless alkenyl succimide (nitrogen content≈1%) 9596A ®; polymeric phosphonate (≈1% phosphorous); and such modified acrylic polymers as Lube Oil Additive 564 (Dupont) or Lube Oil Additive 565, FOA2 (Dupont), where Lube Oil 564 is a terpolymer prepared from a monomer mix containing 50% octadecenyl methacrylate, 10% diethylamine methacrylate and 40% styrene; alkyl methacrylate maleic anhydride; and polymers of the type disclosed in U.S. Pat. No. 3,048,544, namely, alkyl methacrylate, maleic anhydride, and tetraethylene pentamine.

In particular, nitrogen-containing modified acrylic polymers were found to be particularly effective in achieving the balance between the polar groups required for effective dispersion and the oil-soluble or nonpolar groups necessary for compatibility with the largely nonpolar ink vehicle. These materials were found to be particularly effective in the hot melt pigmented inks. Preferred dispersion stabilizers are nitrogen-containing modified methacrylate polymers.

Preferably, the hot melt ink has a melting point above about 40° C. and the dispersion stabilizer is present in an amount of about 1.5% to 20% by weight, and desirably the stabilizer is present in an amount of about 2% to 10% by weight.

DESCRIPTION OF PREFERRED EMBODIMENTS

Pigmented hot melt inks are normally solid at room temperature, but are liquefied for use by heating to a temperature above room temperature such as at least 40° C. Accordingly, the vehicle for a hot melt ink may be any suitable hydrocarbon polymer, wax or waxlike material or $C_{14-24}$ fatty acid or ketone thereof, such as stearic acid, stearone, lauric acid or laurone, or a mixture of two or more of such materials which has a melting point in the desired range, such as at least 50° C. and up to, for example, 160° C. If the hot melt ink is to be used in ink jet printing, the vehicle should also have the appropriate physical properties, such as viscosity and surface tension at the temperature of use which are required for that application. For this purpose, the vehicle may include viscosity and surface tension modifiers.

In order to impart the desired ink color, one or more colored pigments are included in amounts of, for example, 1% to 4% by weight. Since the ink is solid while it is stored at room temperature, there is no tendency for the pigment to settle out or agglomerate during storage. When the ink is used, however, it is maintained in a molten condition at elevated temperature, and the pigment particles will settle out in the absence of periodic stirring or agitation and may agglomerate even though agitated. Conventional dispersion stabilization agents used in inks which are liquid at room temperature are generally ineffective to maintain pigment dispersion and prevent agglomeration in hot melt inks at elevated temperatures. Moreover, as mentioned above, some conventional dispersion stabilizers tend to modify the physical and optical properties of the hot melt ink in an undesired manner.

To overcome these problems, the hot melt ink of the invention includes a dispersion stabilizer which is compatible with low-polarity hydrocarbons used as vehicles, which has low volatility and excellent heat stability at temperatures up to 160° C. and higher, which does not affect the color of the ink. Nitrogen-modified acrylate polymers are especially effective as dispersion-stabilizing agents with many types of pigment and almost all ink vehicles. In order to be effective, a concentration of the nitrogen-modified acrylate polymer should be from about 1.5% to 20% by weight, and preferably from about 3% to about 10% by weight. Preferably, the dispersion-stabilizing agent is a nitrogen-modified methylmethacrylate polymer, but other nitrogen-modified methacrylate polymers, such as nitrogen-modified ethyl methacrylate polymers or mixtures of such polymers may also be used. Appropriate nitrogen-modified methacrylate polymers are the materials marketed by Rohm and Haas under the tradename "Plexol", such as Plexol 955, Plexol 956 and Plexol 1525.

EXAMPES 1 and 2

The following examples were prepared to demonstrate the effect of a nitrogen-modified methacrylate polymer as a stabilizing agent in a hot melt ink. In Example 1, a pigmented hot melt ink without any dispersion stabilizer was prepared, whereas in Example 2 the same hot melt ink was prepared, but 3% by weight of the nitrogen-modified methacrylate polymer designated Plexol 1525 was added. The inks of Examples 1 and 2 were maintained in molten condition at 150° C. and the extent to which the pigment was maintained in dispersion after 72 hours at 150° C. was determined. The compositions in parts by weight used in the examples and the results of the tests are set forth in Table I.

TABLE I

| | Example | |
|---|---|---|
| | 1 | 2 |
| Stearone | 30 | 30 |
| Polyethylene wax (molecular weight 655) | 7 | 7 |
| Hydrocarbon polymers | 53 | 53 |
| Diarylide yellow pigment | 4 | 4 |
| Plexol 1525 | — | 3 |
| Pigment dispersion stability after 72 hours at 150° C. | Poor | Excellent |

EXAMPLES 3-6

An ink was prepared using a linear polyethylene having a molecular weight of about 500 as a vehicle and diarylide yellow pigment. Three additional samples of the same ink were prepared with about 4.5% of Plexol 1525, Plexol 956 and TLA 414 (a calcium sulphonate additive marketed by Texaco), respectively. The pigment dispersion at 150° C. and the dispersion stability after 72 hours at 150° C. were evaluated for each of the exampes. The compositions in parts by weight and the results of the tests are set forth in Table II.

TABLE II

| | Example | | | |
|---|---|---|---|---|
| | 3 | 4 | 5 | 6 |
| Linear polyethylene (molecular weight 500) | 27 | 27 | 27 | 27 |
| Diarylide yellow pigment | 1.5 | 1.5 | 1.5 | 1.5 |
| TLA 414 | — | 1.5 | — | — |
| Plexol 956 | — | — | 1.5 | — |
| Plexol 1525 | — | — | — | 1.5 |
| Pigment dispersion | Nil | Poor | Fair | Good |
| Pigment dispersion stability after 72 hours at 150° C. | Nil | Poor | Fair | Good |

In addition, similar ink samples were prepared using concentrations of 1.5% and 8% by weight of Plexol 1525. Both samples showed good dispersion after 24 hours at 150° C., but the sample containing 1.5% showed some flocculation. After 72 hours at 150° C., the 8% sample had no flocculation but was slightly nonhomogeneous, and the 1.5% sample had some flocculation and nonhomogeneity, along with some large particles. From these tests it was determined that the concentration of the additive should preferably be no less than about 1.5% and that desirable concentrations of nitrogen-modified methacrylate polymer may be more than 8%, such as 10% or 20%.

Although the invention has been described herein with reference to specific embodiments, many modifications and variations therein will readily occur to those skilled in the art. Accordingly, all such variations and modifications are included within the intended scope of the invention.

We claim:

1. A hot melt ink comprising a thermoplastic solid ink composition having a melting point above 40° C. containing a relatively low-polarity thermoplastic ink vehicle, a pigment, and a nitrogen-modified acrylate polymer dispersion-stabilizing agent which is compatible with the relatively low-polarity ink vehicle.

2. A hot melt ink according to claim 1 wherein the dispersion-stabilizing agent is present in an amount of from about 1.5 to about 20 weight percent.

3. A hot melt ink according to claim 1 wherein the dispersion-stabilizing agent is present in an amount of from about 2 to about 10 weight percent.

4. A hot melt ink according to claim 1 wherein the pigment is present in an amount of from about 2 to about 10 weight percent.

5. A hot melt ink according to claim 1 wherein the nitrogen-modified acrylate is a nitrogen-modified methacrylate polymer.

6. A hot melt ink comprising a thermoplastic solid ink composition having a melting point above about 40° C. containing a relatively low-polarity thermoplastic ink vehicle, a pigment in an amount of from about 2 to about 10 weight percent, and a dispersion-stabilizing agent comprising a nitrogen-modified methacrylate polymer in an amount of from about 2 to about 10 weight percent.

* * * * *